Patented May 3, 1938

2,116,439

UNITED STATES PATENT OFFICE 2,116,439

CYCLIC OXIDES AND THEIR PREPARATION

Arthur A. Levine and Oliver W. Cass, Niagara Falls, N. Y., assignors to E. I. du Pont de Nemours & Company, Wilmington, Del., a corporation of Delaware No Drawing. Application April 21, 1936, Serial No. 75,647

5 Claims. (Cl. 260—54)

This invention relates to the preparation of cyclic oxides by reacting chlorhydrins of cyclic compounds with basic substances. More particularly, it relates to the preparation of cyclohexene oxide by reacting cyclohexene chlorhydrin with a strong base.

The preparation of cyclohexene oxide has already been described in the literature but the invention with which this application is concerned, the preparation of cyclohexene oxide from cyclohexene chlorhydrin which is admixed with a substantial amount of cyclohexane, without the necessity for removing said cyclohexene chlorhydrin from the diluent cyclohexane, has never been previously possible.

The advantages of preparing cyclohexene oxide from cyclohexene chlorhydrin which is admixed with cyclohexane, without the necessity for separating the constituents of the mixture or solution, will be at once apparent when attention is directed to our co-pending application Serial No. 71,248, filed March 27, 1936. In this co-pending application we have described and claimed a method of preparing cyclohexene chlorhydrin in admixture with cyclohexane by reacting a mixture of cyclohexene and cyclohexane with hypochlorous acid or its equivalent in dilute aqueous solution at relatively low temperatures. The product prepared by the process described in that application is a mixture of cyclohexene chlorhydrin suspended or dissolved in cyclohexane, the relative amounts of the two ingredients present being proportional to the relative amounts of cyclohexene and cyclohexane present in the initial starting mixture. Usually 35% or less of the mixture will be cyclohexene chlorhydrin and the conversion of the chlorhydrin present into cyclohexene oxide without the necessity of removing the cyclohexane diluent is the particular problem that we have solved in the process herein disclosed.

While we have referred to mixtures of cyclohexene oxide and cyclohexane prepared by the process of our co-pending application it should be understood that our process is not restricted to the preparation of cyclohexene oxide from any particular mixture nor is it restricted to the preparation of cyclohexene oxide from the cyclohexene chlorhydrin present in the reaction product as prepared in our co-pending application. Our method is of broad general utility wherever it is desired to prepare cyclohexene oxide from cyclohexene chlorhydrin which is suspended or dissolved in cyclohexane, without the necessity of first separating the two constituents of the mixture.

Accordingly, one of the objects of this invention is to prepare cyclohexene oxide suspended in cyclohexane from a mixture comprising essentially cyclohexene chlorhydrin and cyclohexane. It is another object of this invention to isolate the cyclohexene oxide in substantially pure form from the cyclohexane diluent. It is another object of this invention to employ in the process of preparing cyclohexene oxide described, an inexpensive aqueous base such as sodium hydroxide and relatively low temperatures. These and still further objects will be apparent from the ensuing disclosure.

Our process comprises reacting a mixture of cyclohexene chlorhydrin and cyclohexane with a relatively strong base such as sodium hydroxide, caustic potash, calcium hydroxide, etc., under conditions wherein the chlorhydrin is converted to the oxide. We prefer to use aqueous solutions of the base employed, but for certain types of operation other solvents such as alcohol may be used. Generally, aqueous solutions of bases will be the reaction medium utilized.

The cyclohexene oxide formed as a result of the reaction between the chlorhydrin and the base separates and will be found in the oily layer containing the cyclohexane diluent. The cyclohexane is unchanged in the reaction and the cyclohexene oxide product is readily separated therefrom by fractional distillation or by some other means.

The cyclohexane present serves the very useful purpose of extracting the cyclohexene oxide formed from the reaction mixture. Accordingly it is unnecessary to subject the aqueous solution of the reaction mixture to steam distillation or solvent extraction since the cyclohexane has already extracted substantially all the cyclohexene oxide formed. This is an important advantage of our process for not only can the conversion of the cyclohexene chlorhydrin into cyclohexene oxide be carried out irrespective of the presence of cyclohexane but the cyclohexane serves the useful function of extracting the cyclohexene oxide product formed.

The yield of cyclohexene oxide is especially high and we have found that yields of 80% of the theoretical are not unusual. Various details of our method which have not already been referred to will be apparent from the following example which constitutes a preferred method of carrying out our process.

*Example*

A solution containing 4 moles, 160 grams, of sodium hydroxide in one liter of water was first prepared. This solution was placed in a three-liter, three-necked flask fitted with a stirrer, a thermometer, and a reflux condenser.

The mixture of cyclohexene chlorhydrin and cyclohexene oxide was then added to this caustic solution. The mixture of chlorhydrin and cyclohexane contained 540 grams (4 moles) of cyclohexene chlorhydrin, and 672 grams (8 moles) of cyclohexane.

The reaction mixture was heated to 80° C. and stirred at that temperature for about 15 minutes. After cooling, the mixture settled into an oily layer which floated above the aqueous layer. This oily layer was removed and dried with anhydrous sodium sulfate. The dried product was then subjected to a distillation whereupon there were secured 660 grams of cyclohexane (boiling point 81° C.), 310 grams of cyclohexene oxide (boiling point 131° C.), and 80 grams of higher boiling products. The yield of cyclohexene oxide corresponds to 79% of the theoretical while the loss of cyclohexane was less than 2%.

It is thus apparent that our process operates at a moderately elevated temperature and is rapid and efficient, resulting in the practically quantitative conversion of cyclohexene chlorhydrin, suspended or dissolved in cyclohexane, into cyclohexene oxide. While we have mentioned caustic soda as the basic material, other bases may also be used. However, for rapid and efficient conversion of the chlorhydrin to the oxide we prefer to use strong bases such as caustic soda, caustic potash and calcium hydroxide.

The practically complete extraction of cyclohexene oxide from the reaction mixture by the cyclohexane diluent is also illustrated by the foregoing example, for the aqueous layer remaining contained practically no cyclohexene oxide. No difficulty is experienced in separating cyclohexene oxide from cyclohexane as there is a substantial difference in the boiling points of the two compounds. Our invention, therefore, also includes the isolation of cyclohexene oxide in substantially pure form from the reaction product.

It should be remembered that the various procedures and amounts heretofore specified are illustrative and are not to be construed as restrictive. The scope of our invention is to be continued in accordance with the appended claims.

We claim

1. A process for preparing cyclohexene oxide from the cyclohexene chlorhydrin content of a mixture of cyclohexene chlorhydrin and cyclohexane which comprises reacting said mixture with a base at an elevated temperature near the boiling point of cyclohexane.

2. A process for preparing cyclohexene oxide from the cyclohexene chlorhydrin content of a mixture of cyclohexene chlorhydrin and cyclohexane which comprises reacting said mixture with a strong base at an elevated temperature near the boiling point of cyclohexane, and then removing said cyclohexane oily layer which contains the product cyclohexene oxide dissolved therein.

3. A process for preparing cyclohexene oxide from the cyclohexene chlorhydrin content of a mixture of cyclohexene chlorhydrin and cyclohexane which comprises reacting said mixture with a base at an elevated temperature near the boiling point of cyclohexane, removing the resulting cyclohexene oxide dissolved in the cyclohexane present in said mixture, and then recovering cyclohexene oxide in substantially pure form by fractionally distilling said cyclohexane containing dissolved therein the desired product cyclohexene oxide.

4. A process for preparing cyclohexene oxide from the cyclohexene chlorhydrin content of a mixture of cyclohexene chlorhydrin and cyclohexane which comprises reacting the cyclohexene chlorhydrin present in said mixture with caustic soda at a moderately elevated temperature near the boiling point of cyclohexane.

5. A process for preparing cyclohexene oxide from the cyclohexene chlorhydrin content of a mixture of cyclohexene chlorhydrin and cyclohexane which comprises reacting said mixture with caustic soda at an elevated temperature near the boiling point of cyclohexane, removing the resulting cyclohexene oxide dissolved in the cyclohexane content of said mixture, and then separating said cyclohexene oxide in substantially pure form from said cyclohexane solvent.

ARTHUR A. LEVINE.
OLIVER W. CASS.